April 21, 1925.  1,534,639
J. J. ENGLEMAN ET AL
DRIVING ATTACHMENT FOR MOTOR VEHICLES
Filed Aug. 5, 1921   3 Sheets-Sheet 1
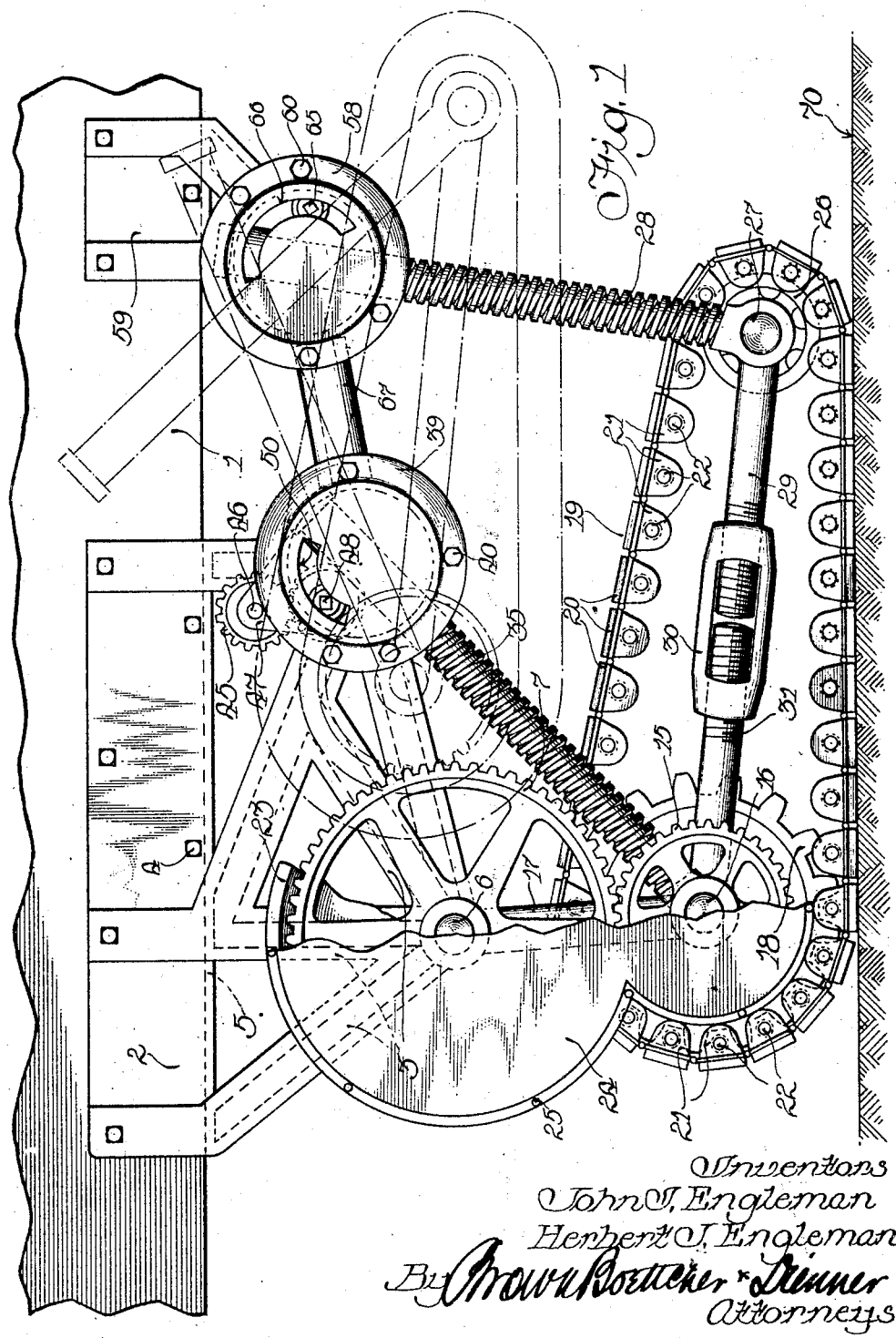
Inventors
John J. Engleman
Herbert J. Engleman April 21, 1925.                                                        1,534,639
                    J. J. ENGLEMAN ET AL
            DRIVING ATTACHMENT FOR MOTOR VEHICLES
                 Filed Aug. 5, 1921          3 Sheets-Sheet 2
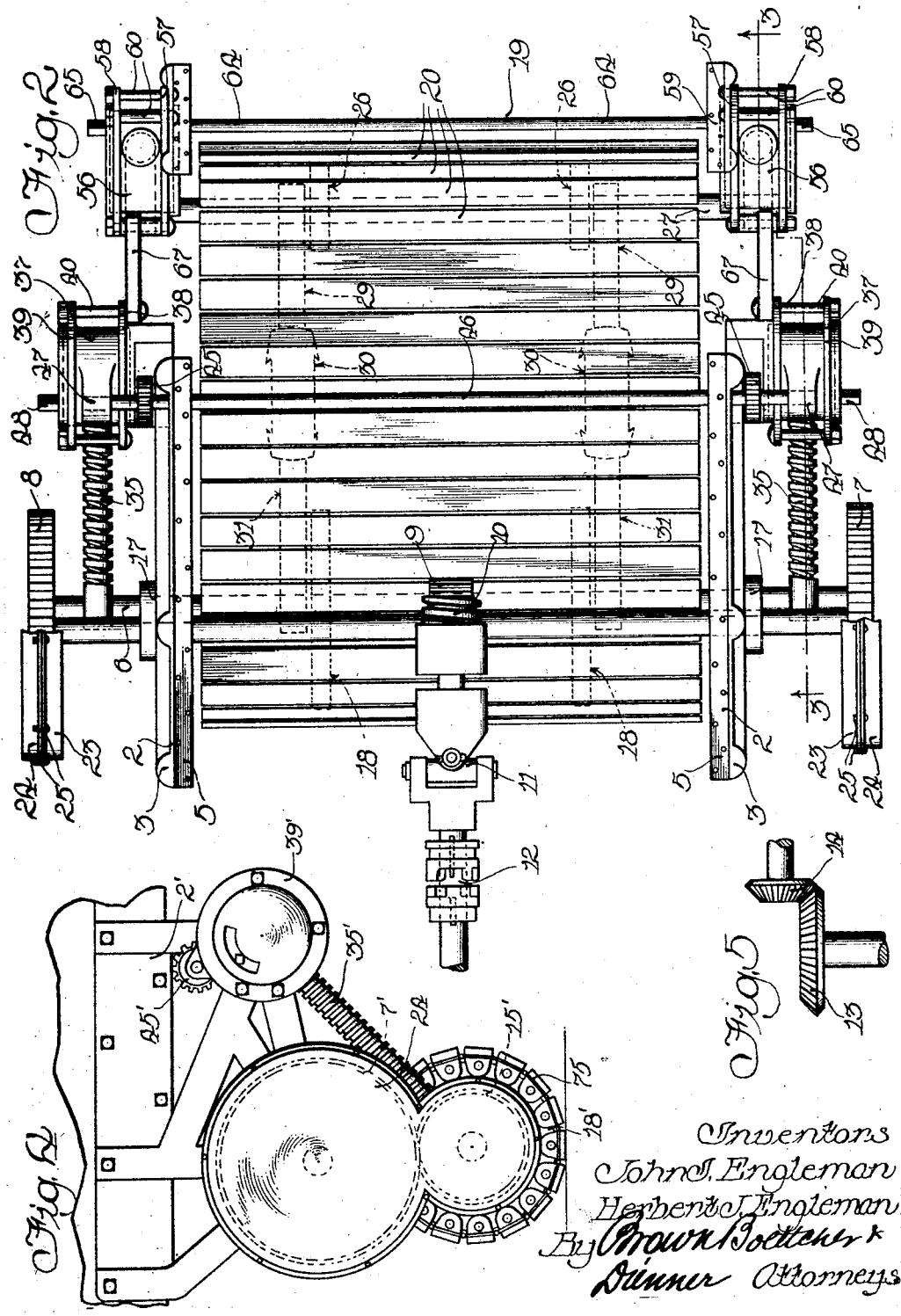

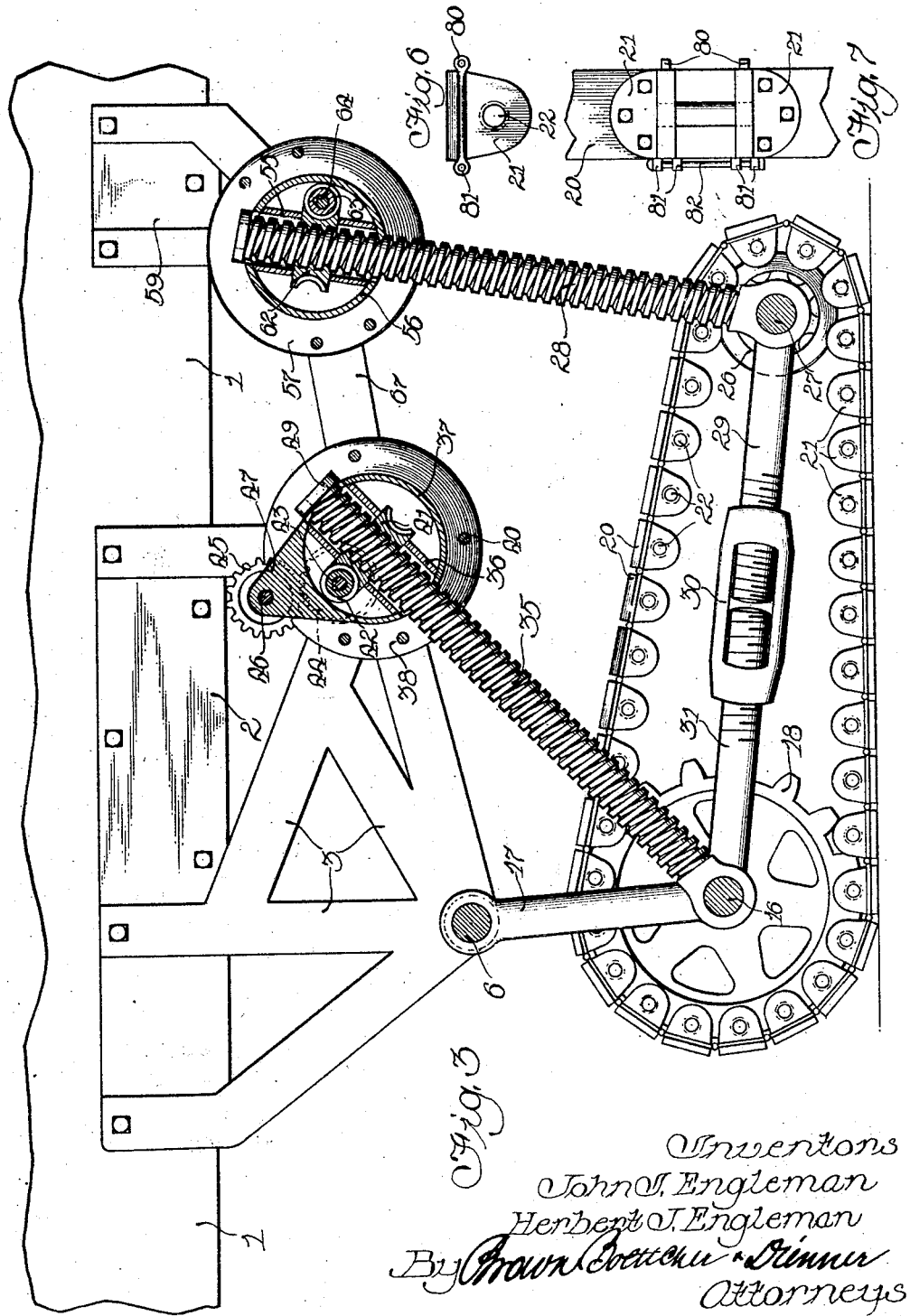

Patented Apr. 21, 1925.

1,534,639

UNITED STATES PATENT OFFICE.

JOHN I. ENGLEMAN, OF KEARNEY, NEBRASKA, AND HERBERT J. ENGLEMAN, OF ARMINTO, WYOMING.

DRIVING ATTACHMENT FOR MOTOR VEHICLES.

Application filed August 5, 1921. Serial No. 489,979.

*To all whom it may concern:*

Be it known that we, JOHN I. ENGLEMAN and HERBERT J. ENGLEMAN, both residing at Kearney, in the county of Buffalo and State of Nebraska, and Arminto, in the county of Natrona and State of Wyoming, respectively, have invented a certain new and useful Improvement in Driving Attachments for Motor Vehicles, of which the following is a full, clear, concise, and exact description, reference being had to the accompanying drawings, forming a part of this specification.

Our invention relates to an improved driving attachment for motor vehicles and the like.

The object of our invention is the provision of a driving attachment for increasing the bearing surface or tractive engagement of the vehicle with the ground when soft or muddy ground is encountered. To this end, we have provided an improved traction tread formed to receive the application of power in a more effective manner than possible heretofore; means for positioning or arranging the tread in and removing the same from driving engagement with the ground, and for adjusting the ground engaging position of the tread; an improved transmission arrangement between the prime mover of the vehicle and the traction or driving tread; a tread the bearing surface of which may be varied; means for adjusting the tension of the tread, and a simple and secure arrangement for detachably attaching the driving attachment to the vehicle.

Our invention aims to provide a novel, simple, inexpensive, reliable and compact assembly for securing the aforesaid features, and such other features as will hereinafter appear.

Certain constructional features are novel and important, and are therefore made the subject-matter of some of the appended claims.

In order that those skilled in the art may be fully acquainted with the nature and scope of our invention, we shall describe a specific embodiment of the invention in connection with the accompanying drawings, in which:

Figure 1 is a side elevational view of a driving attachment embodying our invention, showing fragmentarily the body of the vehicle to which it is attached;

Figure 2 is a top plan view of the driving attachment;

Figure 3 is a vertical longitudinal sectional view taken substantially on the line 3—3 of Figure 2;

Figure 4 is a side elevational view of a modification;

Figure 5 is a detail view of an alternative form of driving connection between the driving attachment of our invention and the driving shaft of the vehicle to which it is attached.

Figure 6 is an enlarged end view of one of the tread blocks or slats, showing the arrangement for coupling the same together; and, Figure 7 is a fragmentary plan view of the same.

Referring now to Figures 1, 2 and 3 of the drawings: 1 indicates the body of the vehicle to which the particular embodiment of our invention shown is attached. The particular formation and details of construction of the body 1 is immaterial in so far as our invention is concerned. These details will vary with the various types of vehicles.

Frame members 2 having depending carrying portions 3 are secured as through suitable bolts 4 or the like, to opposite sides of the vehicle body 1, to the rear of the rear axle (not shown) of the vehicle. While these frame members are preferably provided with shelves or flanges 5 extending beneath the body 1 as shown, their formation will vary with the various types of bodies, so that this is immaterial. A shaft 6 journaled within its opposite ends in the depending carrying portions 3 of the frame members 2 extends transversely through the frame members, and is provided with gear wheels 7 and 8 fixedly mounted upon its opposite ends outwardly beyond the depending portions 3 of the frame members 2.

A cog wheel or worm gear 9 (Figure 2) fixed upon the shaft 6 substantially intermediate its opposite ends, meshes with a driving worm 10 connected through a universal coupling 11 with the drive shaft of the vehicle to which the driving attachment of our invention is attached, preferably through a clutch element 12 when a worm is employed in the vehicle, or through a bevel gear 13 and co-operating pinion 14 (Figure 5) when a bevel gear drive is employed. A suitable rod and lever or like arrangement provides for actuating the clutch element 12, or co-operating gear, as the case may be, from the seat of the vehicle, to connect or disconnect the driving worm 10 with the drive shaft of the vehicle as desired. When the worm 10 is connected with the vehicle drive shaft, it will be rotated thereby, and will, in turn, rotate the transversely arranged shaft 6 through the worm gear 10 and cog wheel 9. Since the attachment of our invention is arranged to the rear end of the drive shaft of the truck, this will be true regardless of the gear in which the truck or vehicle is running.

The gears 7 and 8 on the opposite ends of the shaft 6 mesh with spur gears 15 fixed upon the ends of a shaft 16, so that upon rotation of the shaft 6, the shaft 16 will be rotated accordingly. Each pair of co-operating gears 7 and 15 and 8 and 15 on the opposite sides of the vehicle is encased in a substantially dust and oil tight casing, comprising an inner casing part 23 tightly fitted, as with a suitable boxing, on the shafts 6 and 16, and an outer casing part 24 bolted as shown at 25, or otherwise secured about its edge or periphery, to the inner casing part 23. The shaft 16 is suspended below the shaft 6 by means of a pair of carrying arms 17, in the lower ends of which arms the opposite ends of the shaft 16 are journaled. The upper ends of the arms 17 are sleeved upon the shaft 6, so as to be free to turn thereabout for a purpose which will be hereinafter apparent. A pair of tread driving sprockets or cog wheels 18 are mounted in spaced relation upon the transversely arranged axle or shaft 16.

The tread 19 is of the endless band or apron formation, comprising a number of elements 20 in the nature of blocks or slats which extend transversely of the machine, being preferably of such length as to be confined between the frame members 2 at the opposite sides of the body 1 of the vehicle. Each block or slat 20 is provided upon its inner surface adjacent its ends with a pair of upstanding bracket members 21. Rods 22, preferably of circular cross-section, as shown, extend between each pair of bracket members 21 at the opposite ends of the blocks or slats 20, and are secured therein. The rods 22, when the blocks or slats 20 are connected or linked together in edge to edge relation, are spaced so as to engage or be received between the teeth of the sprocket or cog wheels 18, as shown. The bracket members 21 are provided at one side with projecting tongues 80 and at their opposite sides with ears 81 for receiving the tongues projecting from the adjacent side of the next block or slat 20. Pins 82 inserted through the registering openings in the co-operating tongues 80 and ears 81 of adjacent slats provide for pivotally connecting the same together.

The rear end of the apron 19 travels around a pair of wheels 26 mounted upon a shaft 27, which shaft 27 extends through the lower-eyed ends of a pair of threaded rods or screws 28, and the rear or after-eyed ends of a pair of brace-rods 29. The forward ends of each of the rods 29 are connected through a suitable turnbuckle 30 with the rear or after end of a similar bracing rod 31. The forward-eyed ends of the brace rods 31 are sleeved upon the shaft 16, so that the entire arrangement carrying the shaft 27 and wheels 26 at its after end may be turned about the shaft 16, as will be hereinafter set forth. The lower-eyed ends of a second pair of screws or threaded rods 35 similar to the threaded rods or screws 28 are sleeved upon the transversely extending drive shaft 16.

The opposite ends of each of the screws 35 extends diametrically into a sleeve 36, which sleeve extends diametrically through a drum or block 37 mounted to rotate about a horizontal axis between a pair of casing members 38 and 39. The central areas of these members 38 and 39 are offset to accommodate the drum or block 37, and to provide flanges set inwardly toward one another, through which flanges suitable bolts 40 extend to clamp the carrying members 38 and 39 together, and the block or drum 37 in place there-between. A worm gear 41 mounted in the drum 37 between the sleeves 36 is internally threaded, as shown in Figure 3 for co-operation with the externally threaded or screw portions of the rod 35. This worm gear 41 meshes with a worm 42, fixed upon a shaft 43, upon which shaft 43 a spur gear 44 is also fixedly mounted. The spur gear 44 meshes with a co-operating spur gear 45 fixed upon the shaft 46. The shaft 46 extends transversely below the body 1 of the vehicle, and is journaled at its opposite ends in suitable bearing portions 47 projecting radially from the blocks 37 at the opposite sides of the vehicle.

Each end of the shaft 46 is preferably provided with a gear 45, as shown, so that upon rotation of the shaft 46 by engaging a suitable crank, for instance, with the projecting squared portion 48 (Figure 1) of the shaft 43, and rotating the same, the worm 42 and worm gear 41 at each of the opposite sides of the vehicle will be rotated together to thread or screw the threaded rods or screws 35 upwardly or downwardly therethrough, depending upon the direction of rotation. A small nut 49 threaded upon the upper ends of each of the screws 35 prevents displacement of the screw from the internal thread provided through the worm gears 41, unless, of course, the nut 49 be removed. The projecting squared ends 48 of the shaft 43 project outwardly through arcuate openings 50 in the casing members 39. These arcuate openings 50 permit the necessary rotation of the drums 37.

The threaded rods or screws 28, the lower-eyed ends of which are sleeved upon the shaft 27, as already set out, extend into sleeves 55, arranged diametrically through the drums or blocks 56, one of which is mounted upon each of the opposite sides of the vehicle between inner and outer casing members 57 and 58. The inner casing members 57 are carried by frame members 59 bolted or otherwise suitably secured to the sides of the body 1 rearwardly of the frame members 2. The central areas of the casing members 57 and 58 are offset similarly to the offsetting of the central areas of the casing members 38 and 39, to accommodate the drums 56, and provide flanges set inwardly toward one another, through which flanges suitable bolts 60 may be extended to clamp the outer casing members 58, which are preferably removable, as before, to the inner casing members 57, with the drum 56 in place therebetween.

A worm gear 62 mounted in each of the drums 56 between the sleeves 55 is internally threaded for co-operation with the externally threaded or screw portion of the rods 28. This worm gear meshes with a worm 63 fixed upon a shaft 64 extending transversely beneath the body 1. The shaft 64 is provided at its opposite end with a similar worm for co-operation with a similar worm gear in the drum at the opposite side of the vehicle. The opposite projecting ends of the shaft 64 continue through the casing members 57 and 58, and are squared, or otherwise formed, as shown at 65, to receive a suitable turning crank. The central areas of each of the casing members 57 and 58 are, as before, provided with arcuate openings 66, to permit the necessary rotation of the drums 56. A strap or brace rod 67 is connected between the forward and rear casings which carry the drums 37 and 56 respectively, to effectively brace the same.

It will now be apparent that when desired, rotation of the drive shaft of the vehicle may be transmitted to the driving attachment of our invention by connecting the worm 10 therewith through the clutch element, or co-operating bevel gears 13 and 14, as the case may be. The rotation of the worm 10 thereupon set up will be transmitted to the shaft 6 through the worm gear 9, thence to the shaft 16 through the co-operating spur gears 7 and 15. The rotation of the sprocket or cog wheels 18 thereupon set up will be transmitted to the tread or traction apron 19 through the co-operating rods 22 thereof, driving the tread back and around the wheels 26 on the shaft 27 to move the vehicle over the ground 70, particularly when soft or muddy ground is encountered. Should it be desired for any reason to adjust or vary the tension of the tread or apron 19, such adjustment may be conveniently had by means of the turnbuckle 30, the threads upon the adjacent ends of the bracing rods 29 and 31 being preferably right and left hand threads respectively.

To remove the tread 19 from driving engagement with the ground, the worm gears 41 in the forward drums or cylinders 37, and the worm gears 62 in the rear drums or cylinders 56 are rotated in the proper direction by attaching a suitable crank to the shafts 43 and 64, and turning the same. This rotation of the gears 41 and 62 threads the screws or rods 35, and 28, upwardly, through the blocks 37 and 56, moving the shaft 16 upwardly about the axis of the shaft 6, and the shaft 27 upwardly about the axis of the shaft 16, until the desired position is reached, the rotatable mounting of the drums 37 and 56, between the casing members 38 and 39, and 57 and 58, respectively, permitting such swinging of the screws 28 and 35 as will necessarily accompany such movement.

By the arrangement we have provided, the tread 19 may be positioned in any desired position between the full and dotted line positions in Figure 1. In this connection it should be noticed that as the tread is raised, the spur gears 15 act as planet gears, in that they follow the circumference of the co-operating gears 7, so as to be continuously in driving engagement therewith throughout their various positions. The driving attachment may therefore be set in gear with the engine of the vehicle, irrespective of the height at which the attachment is positioned. If the truck to which our lifting arrangement is attached has sunk into muddy or soft ground before the tread 19 is lowered, the tread may obviously be lowered just sufficiently to aid the main wheels of the vehicle in propelling the same thereover. In other words, the position to which the tread is lowered will vary with the amount the truck has sunk into the soft or muddy ground. It will also be noticed that by turning the gears 41 and 62 relative one another, the ground engaging position or inclination of the tread 19 may be varied in any of its vertical positions to adapt the same to such irregular surfaces as are frequently encountered.

The driving attachment of our invention is adapted for convenient attachment to and removal from the body of a truck or other vehicle. The mechanical advantage of the lifting arrangement for moving the tread 19 up through its various positions is extremely high. The apparatus is so constructed that under certain conditions the frames 59 may be removed from the body 1, so that by uncoupling the blocks or slats 20 and using just enough of such slats to fit tightly around the sprockets or cog wheels 18, the entire rear part of the apparatus may be dispensed with, and only a circular tread used, as shown at 75, in Figure 4. It may be desirable when the roads are only muddy or soft in spots to use only this part of the apparatus, or to use only this part of the apparatus at all times, or it may even be desirable, under certain conditions, to use the entire arrangement at all times. That is, however, immaterial in so far as our invention is concerned.

While we have described our invention in connection with the details of a particular embodiment, we do not intend thereby to limit the invention to such details, as we are aware and contemplate that modifications and changes may be made without departing from the invention which is set out in the appended claims.

We claim:

1. In combination, a driving shaft, a second shaft suspended below and adapted for movement about said driving shaft, drive means between said shafts, a traction tread associated with said second shaft, and means for moving said second shaft about said driving shaft to vary the ground engaging position of said traction tread, said drive means remaining effective to transmit the driving effort to said tread through the various grounds engaging positions thereof.

2. In combination, a driving shaft, a driving gear on said shaft, a traction tread having a shaft provided with a gear in driving engagement with said first gear, and means for adjusting said tread by planetary movement of said second shaft and gear about said first shaft and gear to adjust the position of the tread without interrupting the driving engagement between said gears.

3. In combination, a driving shaft, a driving gear on said shaft, a traction tread having a pair of shafts, a sprocket on one of said tread shafts, a gear on said tread shaft meshing with said driving gear, and a tread member trained over said sprocket and traveling about both said tread shafts, said last gear having planetary movement about said first gear and constant driving engagement therewith to permit adjustment of the tread without interrupting the drive thereto.

4. In combination, a driving shaft, a second shaft, a driving member on said first shaft, a driven member on said second shaft, a traction band trained over and drivingly connecting said driving and driven members, and means between said shafts for adjusting the tension of said traction band, said means comprising a pair of links each having an eyed end on the respective driving and second shafts, and a coupling having threaded engagement with the adjacent ends of said links.

5. In combination, a motor vehicle having a source of power, a shaft, drive means between said source of power and said shaft, a second shaft suspended below said first shaft, drive means between said first and second shafts, a traction tread associated with said second shaft, said shaft being adapted for movement about said first shaft to vary the position of said traction tread, and said drive means remaining effective to transmit the driving effort to said tread through the various ground engaging positions thereof.

6. In combination, a motor vehicle having a source of power, a shaft, drive means between said source of power and said shaft, a second shaft suspended below said first shaft, drive means between said first and second shafts, a third shaft, a traction tread arranged about said second and third shafts, the second shaft being adapted for movement about said first shaft and the third shaft about said second shaft to vary the position of said traction tread.

7. In combination, a pivoted arm, a driving shaft carried by said arm, a second shaft, a traction tread arranged about said driving and second shafts, said driving shaft being adapted for movement about the pivot of said arm, and the second shaft about said driving shaft to vary the position of the traction tread.

8. In combination, a tread carrying arrangement, a traction tread carried thereby, a screw having connection with said tread carrying arrangement, a rotatable drum, said screw extending into said drum and means for threading the screw through said drum to vary the position of the traction tread, rotation of the drum permitting the various positions of said tread.

9. In combination, a motor vehicle having a source of power, a driving shaft adapted for connection with said source of power, a second shaft, a traction band arranged about said shafts, screws connected with said driving and second shafts, said screws extending into rotatable drums, and means within said drums for threading said screws therethrough to vary the position of the traction band, rotation of said drums permitting the various positions of said band.

10. In combination, a driving shaft, a driving gear on said shaft, a traction tread having a driving tread shaft and a driven tread shaft with sprockets on each of said shafts and a tread member trained over said sprockets, a gear on the driving tread shaft, said last gear having planetary adjustment about said first gear and constant driving engagement therewith to permit adjustment of the driving end of the tread without interrupting the drive thereto, and means for swinging the driven tread shaft about the driving tread shaft to adjust the driven end of the tread.

11. In combination, a tread shaft, a sprocket on said shaft, a traction tread trained over and meshing with said sprocket, an adjusting screw having an eyed end on said shaft, a nut engaging on said screw and relatively fixed in the direction of the axis thereof, and means for turning said nut to tread said screw therethrough and adjust the position of the tread.

12. In combination, a tread shaft, a sprocket on said shaft, a traction tread trained over and meshing with said sprocket, an adjusting screw having an eyed end on said shaft, a worm wheel threaded upon said screw and relatively fixed in the direction of the axis thereof, and a worm meshing with said worm wheel for turning same to adjust the position of the tread.

13. In combination, a driving shaft, a driving gear on said shaft, a traction tread having a shaft provided with a gear in driving engagement with said first gear, a sprocket on said tread shaft, an endless tread trained over and meshing with said sprocket, an adjusting screw having an eyed end on said shaft, a nut engaging on said screw and relatively fixed in the direction of the axis thereof, and means for turning said nut to tread said screw therethrough and adjust the tread shaft and gear by planetary movement about the driving shaft and gear to adjust the position of the tread without interrupting the driving connection thereto.

In witness whereof, I hereunto subscribe my name, this 21 day of June, A. D. 1921.

HERBERT J. ENGLEMAN.

In witness whereof, I hereunto subscribe my name, this 24 day of June, A. D., 1921.

JOHN I. ENGLEMAN.